US010054185B2

(12) United States Patent
Cox

(10) Patent No.: US 10,054,185 B2
(45) Date of Patent: *Aug. 21, 2018

(54) METHODS AND APPARATUS FOR POSITION SENSITIVE SUSPENSION DAMPING

(71) Applicant: Fox Factory, Inc., Scotts Valley, CA (US)

(72) Inventor: Christopher Paul Cox, Scotts Valley, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,940

(22) Filed: Feb. 29, 2016

(65) Prior Publication Data

US 2016/0178026 A1    Jun. 23, 2016

Related U.S. Application Data

(63) Continuation of application No. 14/022,030, filed on Sep. 9, 2013, now Pat. No. 9,303,712, which is a continuation of application No. 12/463,927, filed on May 11, 2009, now Pat. No. 8,550,223.

(60) Provisional application No. 61/052,150, filed on May 9, 2008.

(51) Int. Cl.
*F16F 9/48* (2006.01)
*F16F 9/49* (2006.01)
*F16F 9/18* (2006.01)
*B60G 13/08* (2006.01)
*B60G 17/08* (2006.01)
*F16F 9/32* (2006.01)
*F16F 9/19* (2006.01)

(52) U.S. Cl.
CPC ............... *F16F 9/48* (2013.01); *B60G 13/08* (2013.01); *B60G 17/08* (2013.01); *F16F 9/18* (2013.01); *F16F 9/3214* (2013.01); *F16F 9/49* (2013.01); *B60G 2202/24* (2013.01); *B60G 2206/41* (2013.01); *B60G 2500/112* (2013.01); *B60G 2500/114* (2013.01); *F16F 9/19* (2013.01); *F16F 9/3242* (2013.01)

(58) Field of Classification Search
CPC .... F16F 9/18; F16F 9/19; F16F 9/3242; F16F 9/325; F16F 9/49; F16F 9/486; F16F 9/3124
See application file for complete search history.

(56) References Cited

U.S. PATENT DOCUMENTS 2,363,867 A    11/1944 Isely
2,518,553 A    8/1950 Kieber
(Continued)

OTHER PUBLICATIONS

"European Search Report for European Application No. 09159949, 2 pages, dated Sep. 11, 2017 (Sep. 11, 2017)".
"The Lee Company Technical Hydraulic Handbook", 1996, 1-696.

*Primary Examiner* — Anna M Momper

(57) ABSTRACT

Methods and apparatus for position sensitive dampening. In one aspect a fluid damper is provided comprising a damper chamber divided by a piston into a primary compression and a primary rebound chamber; a secondary compression chamber in fluid communication with the damper chamber; and an adjustable fluid meter controlling fluid flow out of the secondary compression chamber.

20 Claims, 5 Drawing Sheets

(56) References Cited

U.S. PATENT DOCUMENTS

| | | | |
|---|---|---|---|
| 2,853,974 A * | 9/1958 | Hewitt | F15B 15/223 |
| | | | 417/437 |
| 2,924,304 A | 2/1960 | Patriquin | |
| 2,973,744 A | 3/1961 | Hennells | |
| 3,127,958 A | 4/1964 | Szostak | |
| 3,175,645 A | 3/1965 | Schafer et al. | |
| 3,238,850 A | 3/1966 | Desmarchelier | |
| 3,494,606 A * | 2/1970 | Siegfried | F16F 9/48 |
| | | | 188/282.7 |
| 3,792,644 A | 2/1974 | Ferguson et al. | |
| 3,795,291 A | 3/1974 | Naito et al. | |
| 4,045,008 A | 8/1977 | Bauer | |
| 4,166,612 A * | 9/1979 | Freitag | F16F 9/49 |
| | | | 188/284 |
| 4,311,302 A | 1/1982 | Heyer et al. | |
| 4,732,244 A | 3/1988 | Verkuylen | |
| 5,517,898 A | 5/1996 | Kim et al. | |
| 5,634,563 A | 6/1997 | Peng | |
| 5,810,128 A | 9/1998 | Eriksson et al. | |
| 5,833,036 A | 11/1998 | Gillespie | |
| 5,988,330 A * | 11/1999 | Morris | B60G 15/062 |
| | | | 188/319.1 |
| 6,029,958 A | 2/2000 | Larsson et al. | |
| 6,120,049 A | 9/2000 | Gonzalez et al. | |
| 6,296,092 B1 | 10/2001 | Marking et al. | |
| 6,318,525 B1 | 11/2001 | Vignocchi et al. | |
| 6,446,771 B1 | 9/2002 | Sintorn et al. | |
| 6,659,241 B2 | 12/2003 | Sendrea | |
| 6,966,412 B2 | 11/2005 | Braswell et al. | |
| 7,374,028 B2 | 5/2008 | Fox | |
| 7,513,490 B2 | 4/2009 | Robertson | |
| 8,550,223 B2 | 10/2013 | Cox et al. | |
| 9,303,712 B2 | 4/2016 | Cox | |
| 2002/0053493 A1 | 5/2002 | Sintorn et al. | |

\* cited by examiner

METHODS AND APPARATUS FOR POSITION SENSITIVE SUSPENSION DAMPING

CROSS-REFERENCE TO RELATED APPLICATIONS

This application claims priority to and is a continuation of the co-pending patent application Ser. No. 14/022,030, entitled "METHODS AND APPARATUS FOR POSITION SENSITIVE SUSPENSION DAMPING," with filing date Sep. 9, 2013, by Christopher Paul Cox, which is incorporated herein, in its entirety, by reference.

The application Ser. No. 14/022,030 claims priority to and is a continuation of the patent application Ser. No 12/463,927, now Issued U.S. Pat. No. 8,550,223, entitled "METHODS AND APPARATUS FOR POSITION SENSITIVE SUSPENSION DAMPING," with filing date May 11, 2009, by Christopher Paul Cox, which is incorporated herein, in its entirety, by reference.

The application with Serial Number claims priority to the patent application, Ser. No. 61/052,150, entitled "METHODS AND APPARATUS FOR POSITION SENSITIVE SUSPENSION DAMPING," with filing date May 9, 2008, by Christopher Paul Cox, which is incorporated herein, in its entirety, by reference.

FIELD OF THE INVENTION

Embodiments of the invention generally relate to methods and apparatus for use in vehicle suspension. Particular embodiments of the invention relate to methods and apparatus useful for variable and position sensitive dampening rate in vehicle shock absorbers.

BACKGROUND OF THE INVENTION

Vehicle suspension systems typically include a spring component or components and a dampening component or components. Typically, mechanical springs, such as helical springs are used with some type of viscous fluid-based dampening mechanism and the two are mounted functionally in parallel. FIG. 1 is a perspective view of a shock absorber 100, typically used as a rear shock absorber for a motorcycle and fixable at an upper end with a mounting eye 105 to a main frame of a cycle and at a lower end with another mounting eye 110 to a link system beneath a swinging arm. The link system (not shown) is designed to leverage the suspension so that initially the suspension feels soft but feels progressively firmer as the shock absorber is compressed further. The shock absorber of FIG. 1 includes a helical spring 115, a damper housing 120 with a piston and chamber (not shown) and an external reservoir 125 having a floating piston (not shown) and pressurized gas to compensate for a reduction in volume in the main damper chamber of the shock absorber as the piston shaft 130 moves into the damper body. Fluid communication between the main chamber of the damper and the reservoir 125 may be via a flow channel including an adjustable needle valve. In its basic form, the damper works in conjunction with the helical spring and controls the speed of movement of the piston shaft by metering incompressible fluid from one side of the damper piston to the other, and additionally from the main chamber to the reservoir, during a compression stroke (and in reverse during the rebound or extension stroke).

Various refinements have been made to shock absorbers like the one shown in FIG. 1 to enhance theft performance. One continuing problem is that of a "bottom out" condition where the dampening piston becomes completely retracted due to compressive forces brought about by terrain and the weight of a rider. Additionally problematic is the fact that the dampening fluid typically increases in temperature during use. A "bottom out" dampener that may be initially set up to be effective at higher dampening fluid temperature will often be too stiff at lower temperatures during initial stages of use (noting that the shock fluid temperature may never even rise to an ideal temperature) creating a harsh ride and poor vehicle handling characteristics. A dampener that works well and initially doesn't bottom out too hard may begin to bottom out as the dampening fluid becomes heated and correspondingly less viscous during use or extended use.

To avoid bottom out, various means have been utilized to increase dampening in a position-sensitive manner whereby the dampening increases as the piston nears the end of a compressive stroke. In one example, illustrated in U.S. Pat. No. 6,446,771 (which patent is incorporated by reference herein in its entirety), a shock absorber includes an additional piston located at an end of the piston shaft and designed to enter a completely closed cup-shaped member as the shock absorber approaches complete compression. The arrangement adds an additional fluid metering dampening piston and therefore additional dampening, as the shock nears the end of its stroke.

U.S. Pat. No. 6,029,958, which is also incorporated by reference herein in its entirety, provides an increase in dampening as the shock is compressed by using a pin and hole arrangement. As illustrated in FIG. 1 of the '958 patent, the piston has an aperture formed in its center and the aperture serves as a fluid path during a first portion of the shock's compression stroke. As the piston moves nearer the bottom out position, a pin mounted at a bottom end of the chamber contacts the aperture and prevents further fluid communication. In this manner, dampening is increased by eliminating a metering path for the fluid.

While the forging patents teach structures for increasing dampening in the final stages of a shock absorber's compression stroke, none provide a complete and user-adjustable system through the use of a user-adjustable secondary dampening arrangement. None of the foregoing teachings suggest any way that bottom out dampening features can be readily adjusted during a ride or "on the fly" so to state. What is needed is a dampening system that will prevent or mitigate "bottom out" and that can be adjusted as a ride, and corresponding use of the shock absorber, progresses. What is needed is a bottom out mitigation system that can be adjusted to account for dampening fluid temperature changes during use. What is needed is a readily accessible and user adjustable secondary dampening arrangement and method for its use.

SUMMARY OF THE INVENTION

Embodiments of the invention are generally related to methods and apparatus for use in vehicle suspension. Particular embodiments relate to methods and apparatus useful in position sensitive dampening in a shock absorber for a motorcycle. In one aspect, a fluid damper is provided comprising a damper chamber divided by a piston into a primary compression and a primary rebound chamber. A secondary compression chamber is in fluid communication with the damper chamber and an adjustable fluid meter controls fluid flow out of the secondary compression chamber. In another embodiment, a bottom out cup is provided at a lower end of a damper chamber for operation in conjunction with a bottom out piston. As the bottom out piston enters and seals the cup, increased dampening takes place as the path of fluid from the cup back into the compression chamber of the shock is limited, in one embodiment, to a blow off valve and/or a user-adjustable metering valve. In another embodiment, communication is selectively permitted between fluid in the sealed bottom out cup and the rebound portion of the chamber via a fluid path(s) formed in the interior of the piston shaft. In one embodiment, the fluid path in the piston shaft is controlled with a reversible check valve that will permit, in one setting, fluid communication only during the rebound stoke of the piston and shaft.

DESCRIPTION OF A PREFERRED EMBODIMENT

Figure 1:
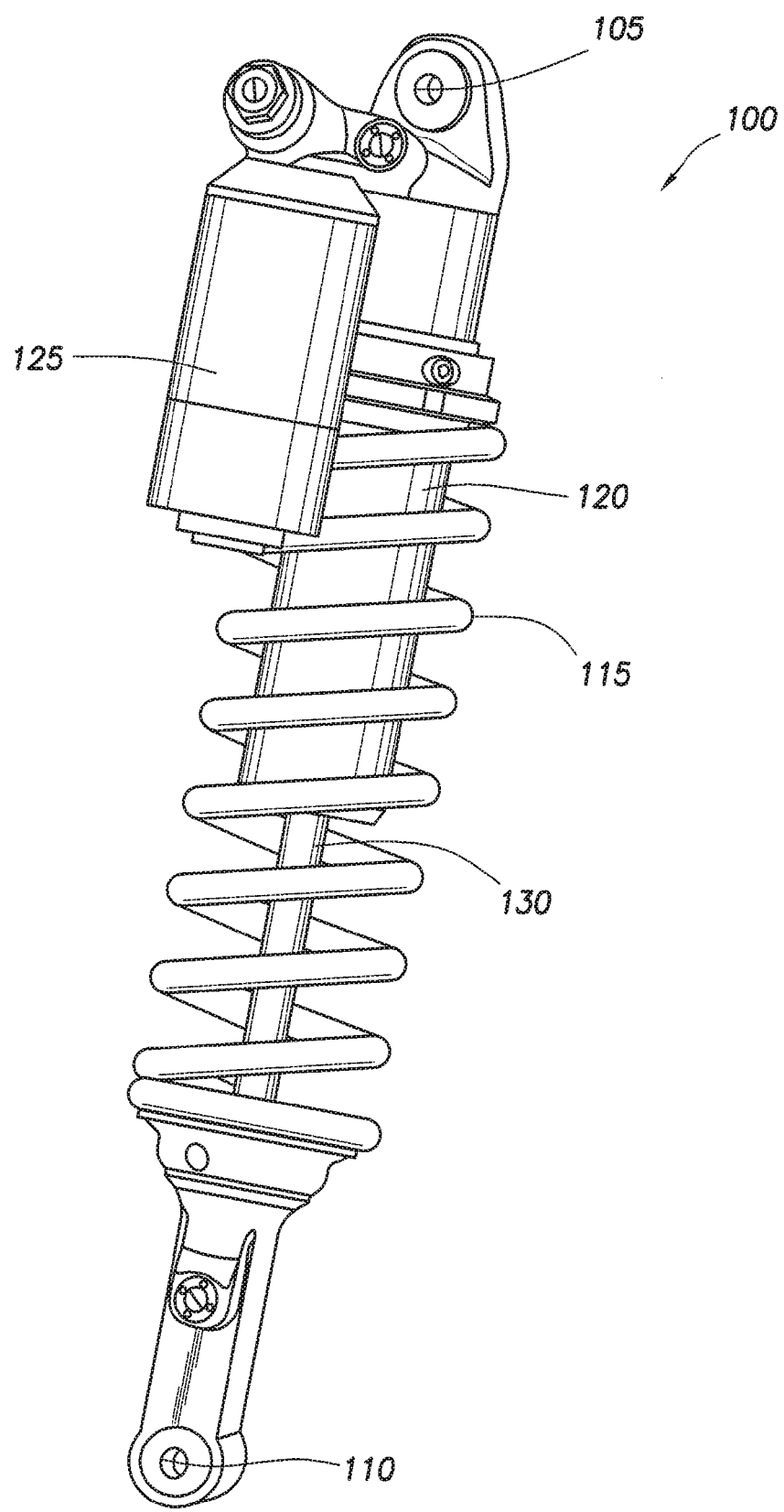
FIG. 1 is a perspective view of a rear shock absorber including a damper, external reservoir and helical spring.
Figure 2:
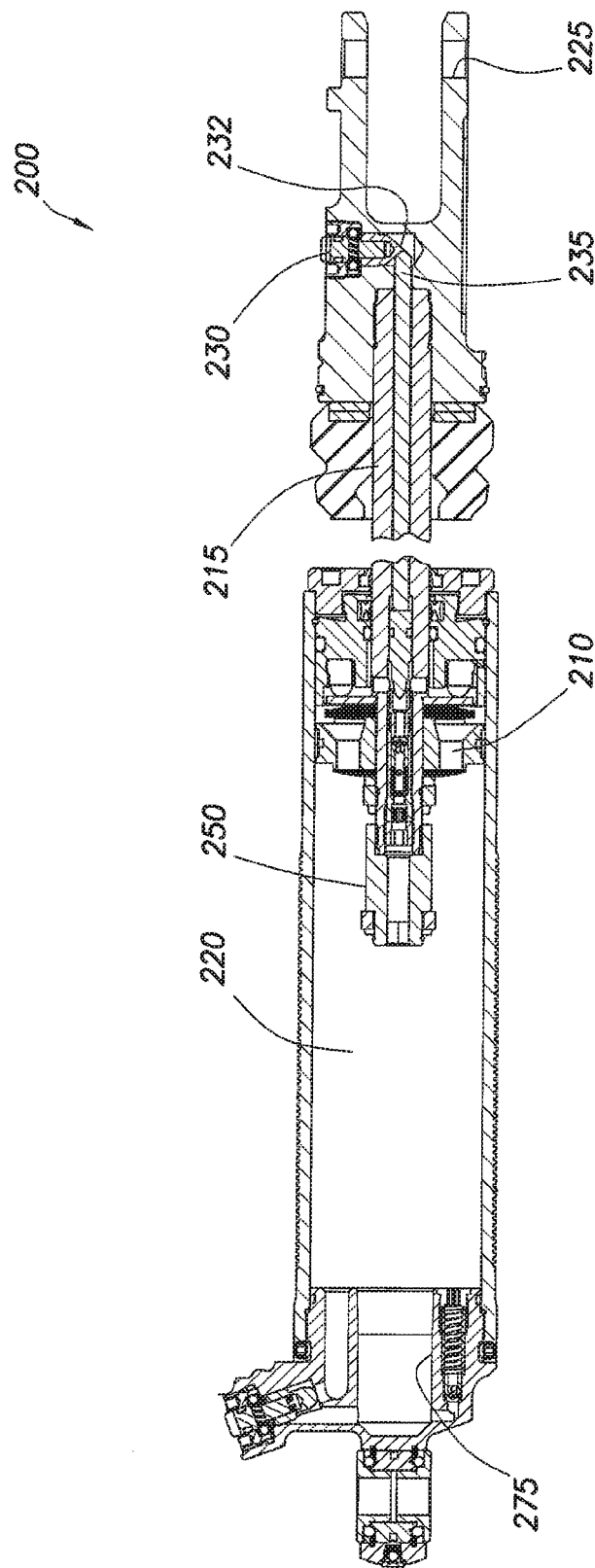
FIG. 2 is a section view showing a shock absorber with a dampening assembly having a secondary, bottom out dampening assembly.

FIG. 2 is a section view showing a dampening assembly 200 of a shock absorber shown in an axially extended position. A dampening piston 210 is fixed relative to a shaft 215, both of which are axially movable relative to a housing or chamber 220. The piston 210 is equipped with fluid paths therethrough to permit dampening fluid within the chamber 220 to be metered through the piston 210. For example, when the shaft 215 moves into the chamber 220, fluid moves from a first side (the compression portion) to an opposite side (the rebound portion) of the chamber 220 through the paths formed in the piston 210. Additionally, fluid must move through a flow path from the chamber 220 into the side reservoir 125, thereby causing a reservoir floating piston to compress a gas chamber in the reservoir 125. A configuration of a side reservoir, including a floating piston, is described in U.S. Pat. No. 7,374,028 which patent is entirely incorporated herein by reference.

Also visible in FIG. 2 is a bottom out piston 250 connected at the end of the shaft 215 and spaced from the dampening piston 210. The bottom out piston is constructed and arranged to engage a bottom out cup 275 formed at the lower end of the chamber 220. As will be explained herein in more detail, the bottom out cup and bottom out piston operate with various dampening devices including a pressure relief or "blow off" valve and a user-adjustable metering valve.

Figure 3A:
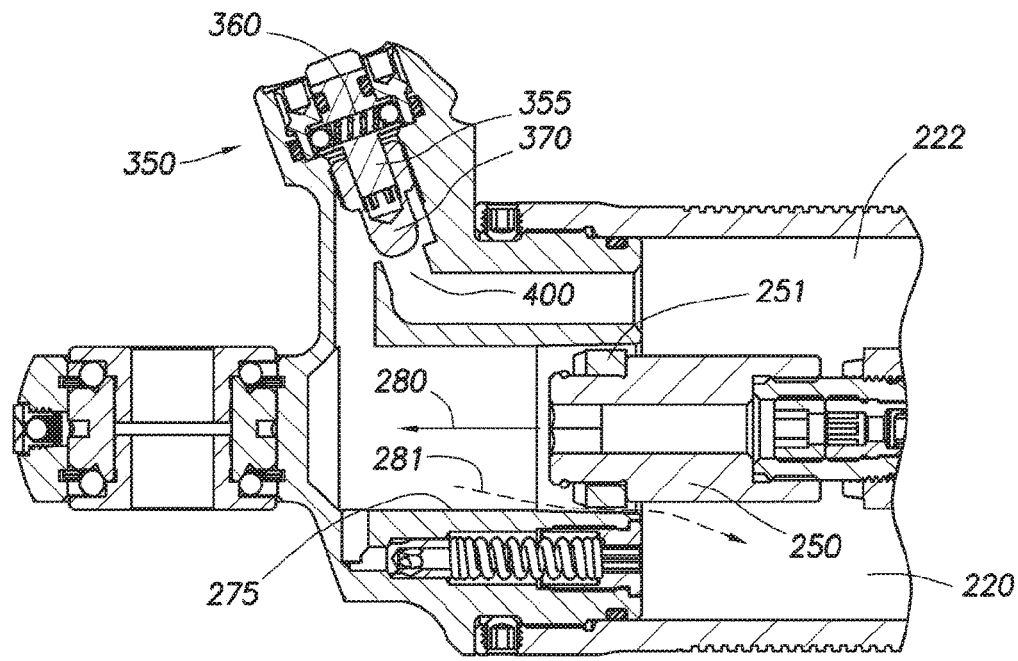
FIG. 3A is a section view showing a bottom out piston entering a bottom out cup during a compression stroke of a shock absorber.

FIG. 3A is a section view showing the bottom out piston 250 entering the bottom out cup 275 during a compression stroke of the shock absorber. The direction of movement of the piston 250 is illustrated by arrow 280. The bottom out piston includes a piston ring or dynamic seal 251 for axially slidable engagement with an inner diameter of the bottom out cup 275. In the embodiment of FIG. 3A, the upper end of the bottom out cup has a diameter that tapers outwards (i.e. larger) permitting, initially in the stroke, some fluid to pass through an annular area formed between the bottom out piston seal 251 and the inner diameter of the cup 275. The piston by-pass flow of fluid through the annular area and into a compression portion 222 of chamber 220 is illustrated by arrow 281.

Figure 3B:
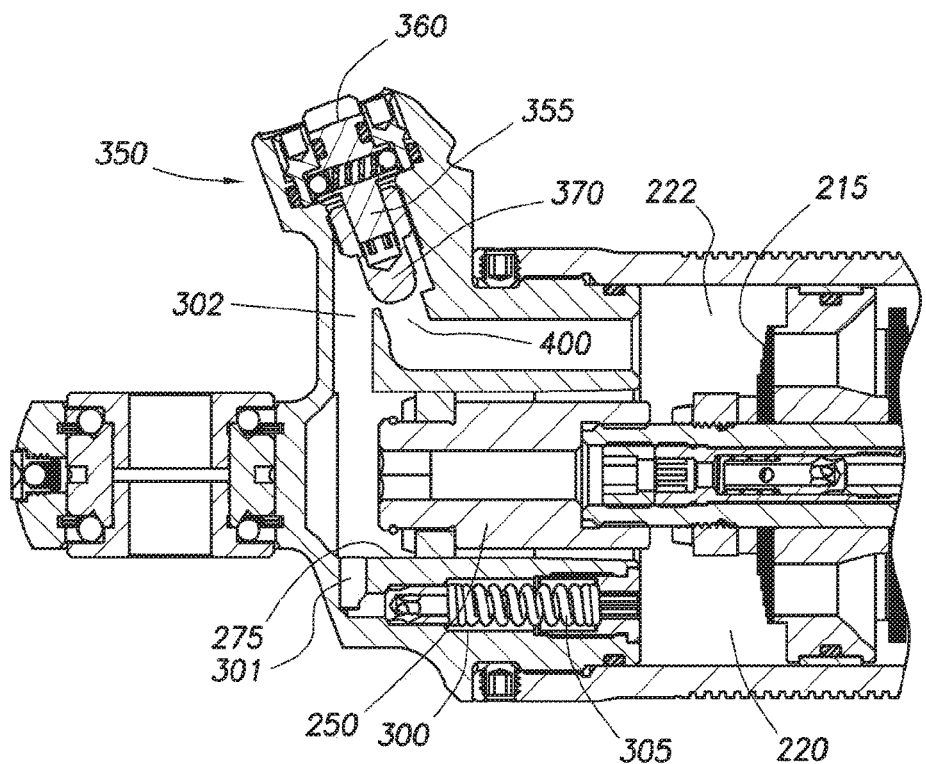
FIG. 3B is a section view showing the bottom out cup of FIG. 3A with the bottom out piston fully engaged and sealed therein.

FIG. 3B is a section view showing the bottom out cup 275 of FIG. 3A with the bottom out piston 250 fully engaged therein. As the piston completely engages the cup 275, dampening is increased because the shaft 215 can only progress further as fluid (e.g. substantially incompressible) is moved from the bottom out cup through one of two paths 301, 302 leading back into the compression portion 222 of chamber 220 (and ultimately also into side reservoir 125 if one is used).

FIG. 3B also shows various adjustable dampening mechanisms that work in conjunction with the bottom out cup and piston. At an end of flow path 301 is a pressure relief or "blow off" valve 300, a high speed compression circuit that operates at a blow off threshold, typically due to a relatively rapid event like the rapid compression of the shock absorber. The blow-off valve 300 selectively allows fluid flow from the bottom out cup 275 to the compression portion 222 of chamber 220 at shaft speeds (in the direction 280) that create fluid pressures within the bottom out cup above the blow off threshold pressure during engagement of piston 250 with bottom out cup 275. The blow-off valve generally comprises a valve opening, a blow-off valve or piston 300 and a compression spring 305. The blow off pressure is determined by a combination of the spring rate of the spring 305, the preload on the spring 305 and the area of the blow-off piston 300 that is subject to fluid pressure from the bottom out cup 275. When fluid pressure in the cup rises above the predetermined (e.g. preset) threshold, the piston is forced away from the piston seat and allows fluid to flow through the valve opening and into the compression portion 222, thus lowering the pressure within the bottom out cup 275. The blow off valve 300 is primarily a safety device and is typically set to crack or "blow off", thereby allowing fluid flow into the compression portion of chamber 200, at a pressure that is relatively high but still low enough to prevent excess pressure build up in the bottom out cup 275 from damaging the shock or the vehicle in which the shock is integrated.

Figure 3C:
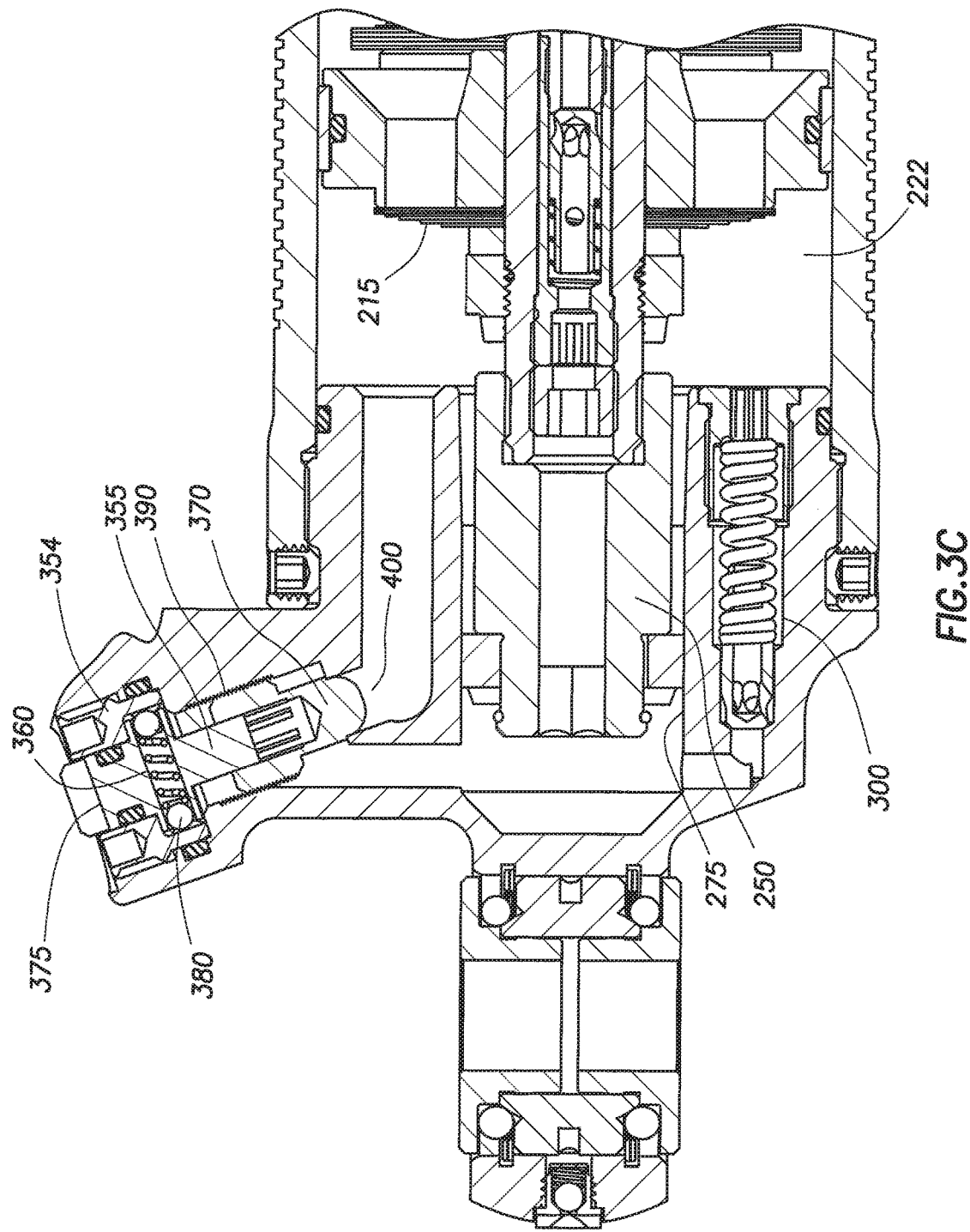
FIG. 3C is a section view of the bottom out cup of FIGS. 3A & 3B showing a blow off valve and a user-adjustable metering valve in communication with the bottom out cup.

Visible in FIGS. 3A-C, at an end of fluid flow path 302 is a user-adjustable metering valve 350 with externally accessible adjustment features. The valve 350 is operable to provide an easily and readily adjustable dampening feature operable with the bottom out chamber 275 and piston 250. In FIGS. 3A-B the valve 350 is shown in an open position whereby fluid may flow through an orifice 400. In FIG. 3C, the valve is shown in a closed position wherein orifice 400 is fully obstructed. The valve 350 is disposed in a bore formed in the damper housing cap. The valve assembly consists of a body 355, an indexing ring 360 and a nipple portion 370. The body 355 includes a slot 375 for a screwdriver head exposed to an area outside the shock absorber and permitting ready access to and adjustment of the valve 350 by a user. In one embodiment the body 355 includes a hand manipulatable knob in addition to a wrench profile or screwdriver recess. Any suitable turning feature may be included with body 355 for easy external access and adjustment. As a body 355 of the valve is turned, the indexing ring 360 consisting of two opposing, outwardly spring-biased balls 380 rotates among indentions formed on an inside diameter of a lock ring 354. The interaction between the balls and the indentions locks the body 355 at each rotational location until the balls 380 are urged out of the indentations by additional rotational force input by the user. The result is that the body 355 will index at various points of its rotation so that positioning of the body 355, and the corresponding setting of valve 350, by the user is maintained against vibration of the shock and the vehicle while in use. As the body 355 rotates, so does the valve or nipple portion 370 at an opposite end of the valve from the head. The body 355 is rotationally engaged with the nipple 370. A male hex member extends from an end of the body 355 into a female hex profile bore formed in the nipple 370. Such engagement transmits rotation from the body 355 to the nipple 370 while allowing axial displacement of the nipple 370 relative to the body 355. Therefore, while the body does not axially move upon rotation, the threaded nipple portion 370 interacts with mating threads 390 formed on an inside diameter of the bore to transmit axial motion, resulting from rotation and based on the pitch of the threads 390, of the nipple portion 370 towards and away from an orifice 400 and between a closed and fully open positions.

In operation, the blow off valve 300 and the user-adjustable metering valve 350 operate independently of each other but each is designed to permit fluid to pass from the bottom out cup 275 to the compression portion 222 of the chamber 220 in order to lessen the increase in dampening effect (i.e. the "increase" being over that due to the piston 210 and the reservoir 125 during the majority of the compression stroke) when the bottom out piston 250 engages the bottom out cup. Even when valve 350 is completely closed with no fluid entering the compression portion of the chamber through the metering valve 350 (i.e. the bottom out dampening rate is very high), the dampening rate will decrease to some extent when a threshold pressure of blow off valve 300 is reached, thereby opening valve 300 and allowing fluid to flow from the bottom out cup 275 to the compression portion of the chamber 220 via flow path 302 and independently of orifice 400.

Figure 4:
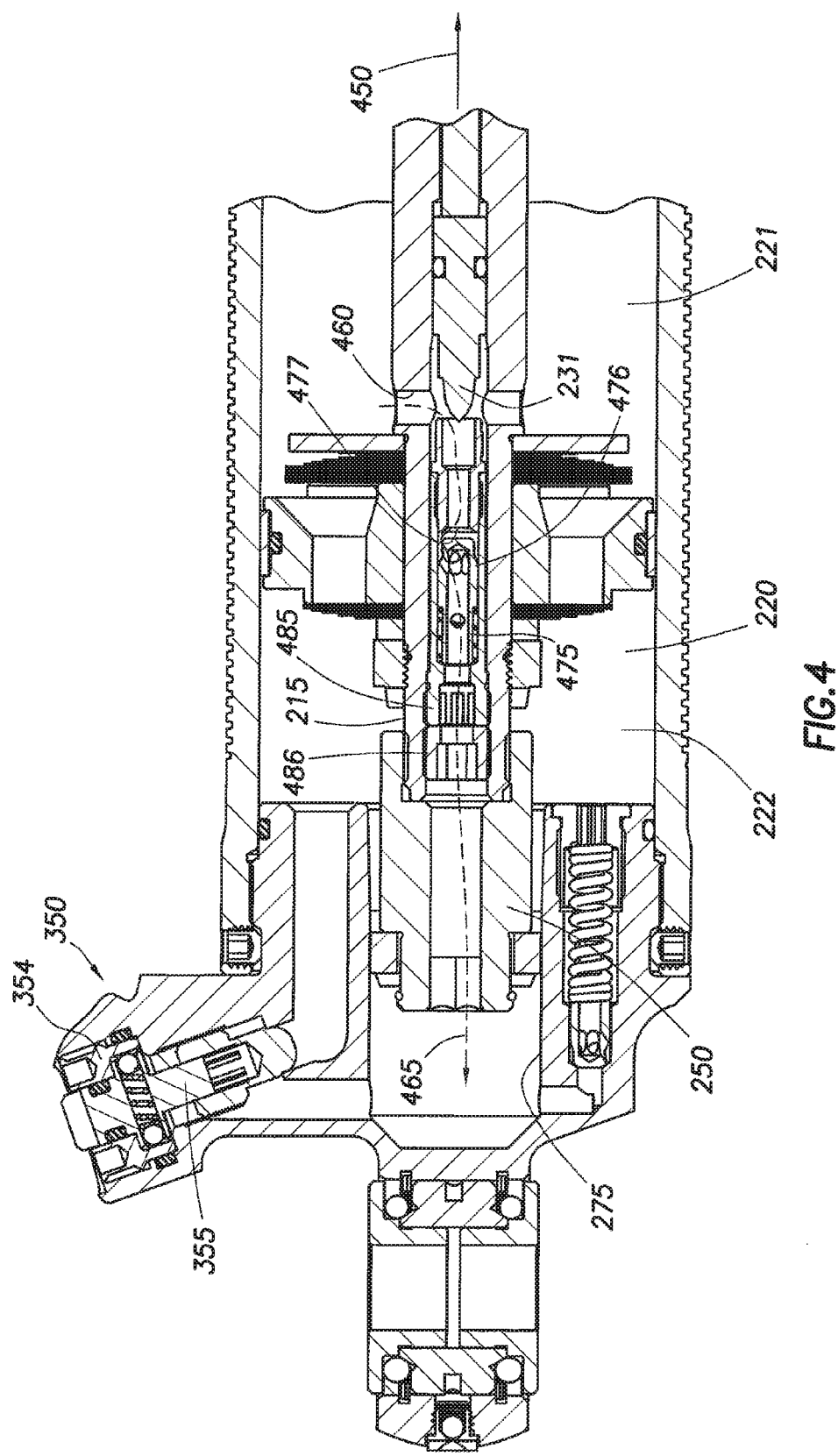
FIG. 4 is a section view showing the bottom out piston being removed from the cup and a piston shaft having a fluid path formed in its interior for providing fluid communication between the bottom out cup and the rebound portion of the dampening chamber during the rebound stroke.

FIG. 4 is a section view showing the piston shaft 215 with another dampening mechanism operable in conjunction with the bottom out cup 275 and piston 250 and also to operate prior to engagement of the piston in the cup. As indicated by movement direction arrow 450 in FIG. 4, the bottom out piston 250 is shown being removed from the bottom out cup 275. In the embodiment of FIG. 4, the piston shaft 215 includes a fluid path formed in its interior and provides for fluid communication between the bottom out cup 275 and a rebound portion 221 of the chamber 220 during the rebound stroke. The path and direction of flow in the embodiment is illustrated by arrow 465. The path winds through a bore in the shaft that is formed coaxially with the centerline of the shaft. At one end, the fluid path including 475, terminates at a lower end of the bottom out piston 250 and, at an upper end, the path terminates at an aperture(s) 460 intersecting the path 465 and leading into the chamber 221.

An adjustment mechanism described herein in relation to FIG. 2, and terminating in bullet shaped member (e.g. adjustable needle valve) 231 permits the volume of fluid flow, upon opening of the valve 475, to be set by a user. As shown in FIG. 2, shaft 215 includes a mounting eye (or clevis) 225 at one end thereof. The mounting eye 225 includes a valve adjuster 230 which is user-adjustable and movable in and out (e.g. by threaded engagement) of the eye in a direction substantially perpendicular to the longitudinal axis of shaft 215. Shaft 215 also includes a coaxially mounted shaft 235 therein, where shaft 235 is axially movable relative to shaft 215. An end 232 of valve adjuster 230 contacts an end of shaft 235 and rotational movement of valve adjuster 230 causes axial movement of shaft 235 relative to shaft 215. Such axial movement of shaft 235 changes the position of a needle valve 231 inside the shaft and thereby adjusts the low speed fluid flow rate and maximum fluid flow rate though the piston shaft (in the direction that is not blocked by a check valve 475) and thereby allows manual adjustment of the dampening rate.

In addition to fluid path 465, the shaft 215 of the embodiment is provided with an adjustable and reversible check valve 475 installed at an upper end of the path and permitting fluid to selectively move in one direction while preventing fluid from moving in an opposite direction. In the embodiment shown in FIG. 4, fluid is only permitted to move toward the lower end of the bottom out piston 250 (as indicated by path arrow 465) and is checked in the reverse direction. The valve 475 is spring loaded to open at a predetermined (set) fluid pressure in the direction of permitted flow (the direction shown by arrow 465). Varying spring preload will vary the fluid pressure at which the check valve is set to crack.

In one embodiment, as shown, dampening of the shock absorber is reduced in the extending or rebound direction, because the fluid flow through the shaft permits a quicker extension or "rebound" of the shaft by permitting an additional volume of fluid to move from the rebound portion 221 of the chamber 220 to the region below the bottom out piston 250 (which, following bottom out, flows into the bottom out cup below piston 250), thus reducing force required to retract the bottom out piston 250 from the cup 275 and therefore, the shaft 215 and permitting a quicker extension. In another embodiment, not shown, the check valve 475 is reversed and dampening on the compression stroke is reduced by the allowance of additional fluid flow through the shaft 215 and along path 465 but in an opposite direction from the one shown in FIG. 4 as direction 465. Reversing the check valve from the shown embodiment results in the valve member 476 and seat 477 being oriented towards the bottom out piston.

In order to facilitate easy reversal and adjustment of the check valve, the bore of shaft 215 is provided with threads to accept a check valve cartridge assembly 485. The cartridge assembly 485 is further secured within the shaft 215 by a threaded nut 486. The cartridge 485 and the nut 486 are flush or below flush relative to the lower end of the shaft 215 and fit therein without additional shaft diameter or length, so that there is no interference with the interface between or operation or assembly of the piston 250 and the shaft 215. The shaft 215 having the provision for a modular valve cartridge 485 allows for other interchangeable valve configurations without modifying surrounding hardware. For instance, the valve cartridge 485 may be equipped with fluid flow resistors (chokes), filters or other micro-fluidic devices as, for example, are illustrated in The Lee Company Technical Hydraulic Handbook, which is copyright 1996 by The Lee Company and entirely incorporated by reference herein, or any suitable combination of the foregoing as may be desirable for the tailoring of flowing fluid characteristics. Further, the inclusion of such cartridge check valve requires no additional length in the overall shaft 215/piston 250 assembly.

In one embodiment the shock absorber 200 and bottom out feature are configured and operated, at the user's discretion, without the check valve 475 (or cartridge 485) installed. In that embodiment fluid may flow along path 465 in either direction, thereby reducing dampening characteristics in both the rebound and compression strokes to the extent allowed by adjustment of the needle valve 231. Alternatively, the needle valve may be completely closed into an adjacent end of cartridge 485 thereby excluding fluid flow in both directions along path 465.

In one embodiment (not shown) the bottom out chamber or "cup" is located proximate an end of the damping chamber corresponding to the hole though which the shaft enters that chamber. A "bottom out piston" surrounds the shaft and is axially movable relative thereto (there though). The primary damping piston includes a connector which connects it to the bottom out piston and the connector is capable of bearing tension between the two pistons but not compression. A simple embodiment of such a connector may comprise a flexible cable. The bottom out piston is forced into the bottom out cup by direct engagement of the "topping out" primary damping piston at near full extension of the shock absorber. In extended positions of the shock absorber the connector between the primary and bottom out pistons is slack. As the shock absorber is compressed to near bottom out position, the connector is placed in tension and begins to pull the bottom out piston from within the bottom out cup thereby creating a suction (or vacuum) within the bottom out cup. The bottom out cup includes a metering valve, in principle as described herein, for metering fluid through a path between (into) an interior of the bottom out cup (such interior formed by the cup and the engaged bottom out piston) and (from) the rebound chamber thereby relieving the vacuum while creating an increased damping effect near bottom out. It is contemplated that the "bottom out cup" and "bottom out piston" may include many varied embodiments while retaining adjustability.

Each dampening mechanism described is usable with a bottom out cup and piston to provide a variety of selectable and/or adjustable dampening options in a shock absorber near the end of a compression stroke (and some throughout either stroke) or beginning of a rebound stroke. Embodiments described herein may also be adapted to work with dampeners generally as if the bottom out piston 250 and the bottom out cup described herein where the dampening piston and cylinder. For example, the user-adjustable metering valve 350 can be set by a user to permit a predetermined amount of fluid to flow between the cup and the compression portion 221 chamber 220 of the damper. The blow off valve 300, depending upon its setting, permits fluid flow in the event that pressure in the cup exceeds the threshold pressure of the blow off valve circuit. Operation of the blow off valve is in part determinable by the setting of the user-adjustable metering valve as its more or less meting of fluid operates to lessen or increase, respectively, the fluid pressure in the bottom out cup. Also, the reversible check valve 475 in the hollow shaft can be arranged to reduce dampening in either the compression or the rebound stroke of the piston.

While the foregoing is directed to embodiments of the present invention, other and further embodiments of the invention may be implemented without departing from the scope of the invention, and the scope thereof is determined by the claims that follow.

What is claimed is:

1. A damper for a shock absorber comprising:
   a damper chamber having a compression portion and a rebound portion;
   a dampening piston coupled to a piston shaft, said dampening piston disposed in said damper chamber and axially movable relative to said damper chamber, said dampening piston separating said compression portion from said rebound portion;
   a bottom out piston coupled to said piston shaft, said bottom out piston disposed in said damper chamber and axially movable relative to said damper chamber;
   a bottom out cup formed at a lower end of said damper chamber, said bottom out cup configured for holding a damping fluid and for receiving said bottom out piston during a compression stroke of said shock absorber, wherein said bottom out cup comprises an upper end having a diameter that tapers outwards;
   a blow-off valve coupled with said bottom out cup via a first fluid path and coupled to said compression portion, said blow-off valve configured for selectively allowing a first portion of said damping fluid to flow, from said bottom out cup, through said first fluid path and to said compression portion; and
   an adjustable metering valve coupled with said bottom out cup via a second fluid path and coupled to said compression portion, said adjustable metering valve configured for allowing a second portion of said damping fluid to flow from said bottom out cup, through said second fluid path and to said compression portion.

2. The damper for a shock absorber of claim 1 wherein said blow-off valve and said adjustable metering valve operate independently of each other.

3. The damper for a shock absorber of claim 1 further comprising:
   a third fluid path, said third fluid path formed in the interior of said piston shaft, said third fluid path providing fluid communication between said bottom out cup and said rebound portion of said chamber.

4. The damper for a shock absorber of claim 3 wherein said third fluid path extends through a bore in said piston shaft, said bore formed coaxially with a centerline of said piston shaft.

5. The damper for a shock absorber of claim 4 wherein a first end of said third fluid path terminates at a lower end of said bottom out piston, and a second end of said third fluid path terminates at an aperture in said piston shaft, said aperture in said piston shaft leading into said rebound portion of said chamber.

6. The damper for a shock absorber of claim 3 further comprising:
   an adjustment mechanism disposed in said third fluid path, said adjustment mechanism disposed to adjust a rate of flow of said damping fluid through said third fluid path.

7. The damper for a shock absorber of claim 6 wherein said adjustment mechanism is user-adjustable.

8. The damper for a shock absorber of claim 3 further comprising:
   a reversible check valve disposed in said third fluid path, said reversible check valve disposed to selectively permit said damping fluid to move in one direction while preventing said damping fluid from moving in an opposite direction.

9. The damper for a shock absorber of claim 3 wherein said reversible check valve is disposed to reduce dampening during a compression stroke of said dampening piston.

10. The damper for a shock absorber of claim 3 wherein said reversible check valve is disposed to reduce dampening during a rebound stroke of said dampening piston.

11. The damper for a shock absorber of claim 8 wherein said reversible check valve is user-adjustable.

12. The damper for a shock absorber of claim 4 further comprising:
   a removable check valve cartridge assembly disposed within said bore.

13. A damper for a shock absorber comprising:
   a damper chamber having a compression portion and a rebound portion;
   a dampening piston coupled to a piston shaft, said dampening piston disposed in said damper chamber and axially movable relative to said damper chamber, said dampening piston separating said compression portion from said rebound portion;
   a bottom out piston coupled to said piston shaft, said bottom out piston disposed in said damper chamber and axially movable relative to said damper chamber;
   a bottom out cup formed at a lower end of said damper chamber, said bottom out cup configured for holding a damping fluid and for receiving said bottom out piston during a compression stroke of said shock absorber, wherein said bottom out cup comprises an upper end having a diameter that tapers outwards;
   a blow-off valve coupled with said bottom out cup via a first fluid path and coupled to said compression portion, said blow-off valve configured for selectively allowing a first portion of said damping fluid to flow, from said bottom out cup, through said first fluid path and to said compression portion;
   an adjustable metering valve coupled with said bottom out cup via a second fluid path and coupled to said compression portion, said adjustable metering valve configured for allowing a second portion of said damping fluid to flow from said bottom out cup, through said second fluid path and to said compression portion, wherein said blow-off valve and said adjustable metering valve operate independently of each other; and
   a third fluid path, said third fluid path formed in the interior of said piston shaft, said third fluid path providing fluid communication between said bottom out cup and said rebound portion of said chamber.

14. The damper for a shock absorber of claim 13 wherein said third fluid path extends through a bore in said piston shaft, said bore formed coaxially with a centerline of said piston shaft.

15. The damper for a shock absorber of claim 14 wherein a first end of said third fluid path terminates at a lower end of said bottom out piston, and a second end of said third fluid path terminates at an aperture in said piston shaft, said aperture in said piston shaft leading into said rebound portion of said chamber.

16. The damper for a shock absorber of claim 13 further comprising:
   an adjustment mechanism disposed in said third fluid path, said adjustment mechanism disposed to adjust a rate of flow of said damping fluid through said third fluid path.

17. The damper for a shock absorber of claim 16 wherein said adjustment mechanism is user-adjustable.

18. The damper for a shock absorber of claim 13 further comprising:
   a reversible check valve disposed to reduce dampening during a compression stroke of said dampening piston.

19. The damper for a shock absorber of claim 13 further comprising:
   a reversible check valve disposed to reduce dampening during a rebound stroke of said dampening piston.

20. The damper for a shock absorber of claim 14 further comprising:
   a removable check valve cartridge assembly disposed within said bore.

* * * * *